United States Patent
Gu et al.

(10) Patent No.: US 9,131,036 B2
(45) Date of Patent: Sep. 8, 2015

(54) MOBILE TERMINAL WITH CHARGING SURGE PROTECTION CIRCUIT

(75) Inventors: Jianliang Gu, Huizhou (CN); Zhan Gu, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 223 days.

(21) Appl. No.: 13/807,007

(22) PCT Filed: Mar. 29, 2011

(86) PCT No.: PCT/CN2011/072230
§ 371 (c)(1),
(2), (4) Date: Dec. 26, 2012

(87) PCT Pub. No.: WO2012/013046
PCT Pub. Date: Feb. 2, 2012

(65) Prior Publication Data
US 2013/0109444 A1    May 2, 2013

(30) Foreign Application Priority Data

Jul. 30, 2010    (CN) .......................... 2010 1 0242740

(51) Int. Cl.
*H04B 1/38*     (2006.01)
*H04M 1/02*    (2006.01)
*H02H 7/18*    (2006.01)
*H02H 9/04*    (2006.01)
*H02J 7/00*    (2006.01)

(52) U.S. Cl.
CPC .............. *H04M 1/0202* (2013.01); *H02H 7/18* (2013.01); *H02H 9/04* (2013.01); *H02J 7/0029* (2013.01)

(58) Field of Classification Search
CPC ................ H04M 1/0262; H04M 1/73; H04M 2001/0204
See application file for complete search history.

(56) References Cited

U.S. PATENT DOCUMENTS

| | | | |
|---|---|---|---|
| 3,382,377 A * | 5/1968 | Huffman et al. | 327/28 |
| 2008/0310198 A1 | 12/2008 | Chiang et al. | |
| 2009/0270131 A1* | 10/2009 | Zhou et al. | 455/558 |
| 2011/0151820 A1* | 6/2011 | Kim | 455/311 |

FOREIGN PATENT DOCUMENTS

| | | |
|---|---|---|
| CN | 101453128 A | 6/2009 |
| EP | 1253696 A1 | 10/2002 |
| WO | 2006001088 A1 | 1/2006 |

* cited by examiner

*Primary Examiner* — Keith Fang
(74) *Attorney, Agent, or Firm* — Cheng-Ju Chiang

(57) ABSTRACT

The present disclosure provides a mobile terminal, which comprises a charging port, a power management unit (PMU), a battery, and a charging surge protection circuit disposed between the charging port and the PMU. The charging surge protection circuit comprises a low-pass filtering circuit, a switch control circuit, a diode and a first resistor. The low-pass filtering circuit has an input terminal connected to an output terminal of the charging port, and an output terminal connected to a first input terminal of the PMU. The switch control circuit has a first input terminal connected to the low-pass filtering circuit, a second input terminal connected to an output terminal of the PMU, and an output terminal connected to the first resistor via the diode. The first resistor is connected to an anode of the battery, and a cathode of the battery is grounded.

7 Claims, 2 Drawing Sheets

MOBILE TERMINAL WITH CHARGING SURGE PROTECTION CIRCUIT

CROSS REFERENCE TO RELATED APPLICATIONS

The present application is a 35 U.S.C. §371 National Phase conversion of International (PCT) Patent Application No. PCT/CN2011/072230, filed on Mar. 29, 2011, the disclosure of which is incorporated by reference herein. The PCT International Patent Application was published in Chinese.

FIELD OF THE INVENTION

The present disclosure generally relates to the technical field of electronics, and more particularly, to a mobile terminal.

BACKGROUND OF THE INVENTION

The battery charging function of a mobile phone is closely related to safety in use of the mobile phone. Particularly, variations in voltage of the power grid and abnormal operations of the user may cause the battery charger to output a surge voltage. If the surge voltage surges into the mobile phone during the battery charging process, then a potential safety hazard will result.

Common battery chargers for mobile phones have only a limited self-regulating capability, and generally can only regulate voltage variations within a range of 30 kHz (Kilo Hertz) to 60 kHz. However, in practice applications, variations in voltage of the power grid may take place in some areas, or some users may connect the battery charger to a mobile phone firstly before the battery charger is plugged into a socket.

Both the two cases may incur voltage variations greater than 60 kHz, in which case the battery charger will be deprived of the self-regulating capability and output a surge voltage. For instance, at a moment when the battery charger is plugged into the socket, a surge voltage having a duration of 20 ns (nano seconds) and a peak-peak voltage value (Vpp) of 30 V will be outputted. This surge voltage will surge into the mobile phone to impact the mobile phone, which is very likely to cause damage to or have other adverse effects on the mobile phone.

Referring to FIG. 1, there is shown a charging circuit of a conventional mobile phone. The charging circuit comprises a charging port 101, a capacitor C0, a metal oxide semiconductor (MOS) transistor M0, a diode D0, a resistor R0 and a power management unit (PMU) 102. The charging port 101 has an output terminal connected to a first input terminal of the PMU 102, and the capacitor C0 has one end connected to the first input terminal of the PMU 102 and the other end grounded. The MOS transistor M0 has a source connected to the first input terminal of the PMU 102, a gate connected to an output terminal of the PMU 102 and a drain connected to the resistor R0 via the diode D0; and the resistor R0 is connected to a battery. Moreover, a cathode of the diode D0 is connected to a second input terminal of the PMU, and an anode of the battery B0 is connected to the second input terminal of the PMU 102.

In the aforesaid charging circuit of the mobile phone, no protection circuit against the surge voltage is provided. Consequently, once a surge occurs, the power input, individual control ports and the battery itself of the mobile phone will all be impacted. Although there are over voltage protection (OVP) devices available in the market, the OVP devices have a reaction time of about 5 µs and, thus, cannot provide effective protection against the surge. Moreover, the OVP devices have a high cost.

Accordingly, there is still room for improvement and advancement of the surge protection technologies of the prior art mobile terminal.

SUMMARY OF THE INVENTION

An objective of the present disclosure is to provide a mobile terminal, which can eliminate the surge voltage generated during the battery charging process of the mobile terminal to protect the mobile terminal against the surge voltage.

To achieve the aforesaid objective, the present disclosure provides a mobile terminal, which comprises a charging port, a power management unit (PMU) and a battery, wherein the mobile terminal further comprises a charging surge protection circuit disposed between the charging port and the PMU;

the charging surge protection circuit comprises a low-pass filtering circuit, a switch control circuit, a diode and a first resistor;

the low-pass filtering circuit has an input terminal connected to an output terminal of the charging port, and an output terminal connected to a first input terminal of the PMU;

the switch control circuit has a first input terminal connected to the low-pass filtering circuit, a second input terminal connected to an output terminal of the PMU, and an output terminal connected to the first resistor via the diode; and the first resistor is connected to an anode of the battery, and a cathode of the battery is grounded, wherein a cathode of the diode is connected to a second input terminal of the PMU and the anode of the battery is connected to a third input terminal of the PMU.

Preferably, the low-pass filtering circuit comprises an inductor and a first capacitor, the inductor is disposed between the output terminal of the charging port and the first input terminal of the PMU, and the first capacitor has one end connected to the inductor and the other end grounded.

Preferably, the switch control circuit comprises a metal oxide semiconductor (MOS) transistor and a second capacitor; the MOS transistor has a source connected to the first input terminal of the PMU, a gate connected to the output terminal of the PMU, and a drain connected to the diode; and the second capacitor has one end connected to the source of the MOS transistor and the other end connected to the gate of the MOS transistor.

Preferably, a second resistor is disposed between the gate of the MOS transistor and the output terminal of the PMU.

Preferably, the MOS transistor is a P-channel MOS transistor.

Preferably, the mobile terminal is a mobile phone.

According to the mobile terminal of the present disclosure, a charging surge protection circuit is disposed in the mobile terminal for protection against the charging surge during the battery charging process of the mobile terminal. Moreover, the charging surge protection circuit comprises a low-pass filtering circuit and a switch control circuit, so two surge voltage protection stages are achieved in the mobile terminal to effectively protect individual ports and the battery of the mobile terminal.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

Hereinbelow, the present disclosure will be further described with reference to the attached drawings and embodiments thereof.

The present disclosure provides a mobile terminal, which is an electronic product such as a mobile phone, a Moving Picture Experts Group Audio Layer III (MP3) player or a personal access phone system (PAS). According to the present disclosure, one low-pass filtering circuit and one switch control circuit are additionally provided in a charging circuit of the mobile terminal so that the charging circuit has a two-stage protection function and can eliminate the surge voltage during the battery charging process of the mobile terminal.

To make the objectives, technical solutions and effects of the present disclosure clearer, the present disclosure will be further detailed hereinbelow with reference to the attached drawings and embodiments thereof. It shall be understood that, the embodiments described herein are only intended to explain but not to limit the present disclosure.

Figure 1:
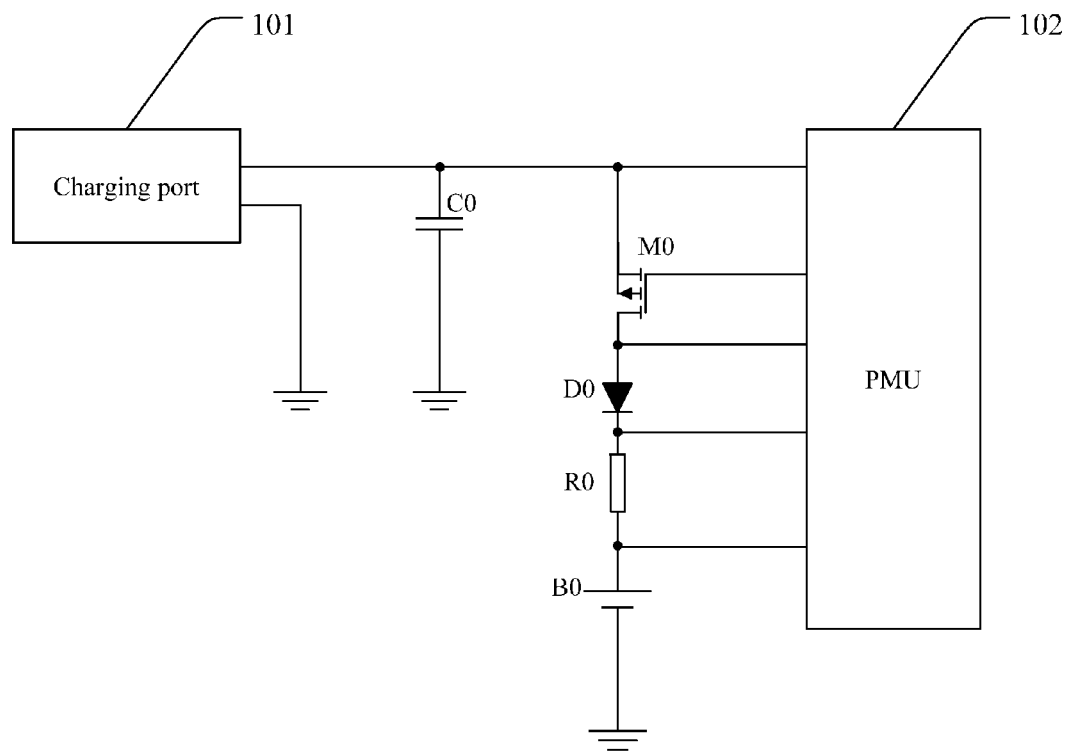
FIG. 1 is a diagram illustrating a charging circuit of a prior art mobile phone.
Figure 2:
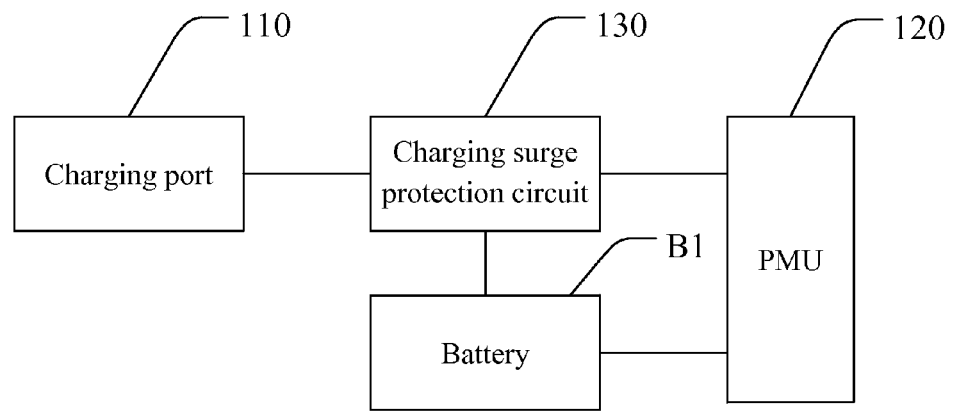
FIG. 2 is a schematic block diagram illustrating a charging circuit of a mobile terminal according to the present disclosure.

Referring to FIG. 2, the mobile terminal of the present disclosure comprises a charging port 110, a PMU 120, a battery B1 and a charging surge protection circuit 130. The charging port 110 is disposed on a case of the mobile terminal and allows a battery charger to be inserted therein. The PMU is a power management chip commonly used in a conventional mobile terminal. The charging surge protection circuit 130 is disposed between the charging port 110 and the PMU 120, and serves to eliminate the surge voltage in the battery charging process.

Figure 3:
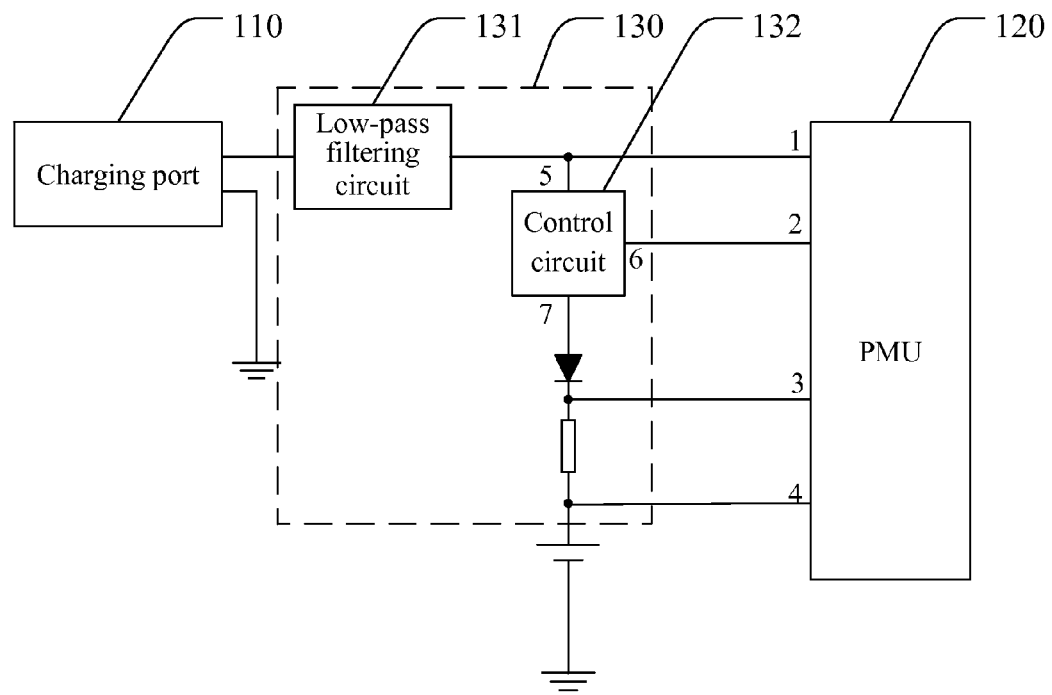
FIG. 3 is a schematic circuit diagram illustrating a charging surge protection circuit of the mobile terminal according to the present disclosure.

Referring to FIG. 3, the charging surge protection circuit 130 comprises a low-pass filtering circuit 131, a switch control circuit 132, a diode D1 and a first resistor R1.

The PMU 120 comprises a first input terminal 1 for detecting whether the battery charger is plugged, a second input terminal 3 for detecting a charging current, a third input terminal 4 for detecting an input voltage of the battery and an output terminal 2 for controlling a charging switch.

The charging port 110 has a first output terminal connected to an input terminal of the low-pass filtering circuit 131 and a second output terminal grounded; and an output terminal of the low-pass filtering circuit 131 is connected to the first input terminal 1 of the PMU 120. The low-pass filtering circuit 131 is a first-stage protection circuit of the mobile terminal, and is mainly used to attenuate the surge voltage generated during the battery charging process of the mobile terminal so as to significantly reduce the surge energy transmitted into the mobile terminal.

The switch control circuit 132 has a first input terminal 5 connected to the output terminal of the low-pass filtering circuit 131, a second input terminal 6 connected to the output terminal 2 of the PMU 120, and an output terminal 7 connected to an anode of the diode D1. When the surge energy is still exhibited in the voltage applied to the switch control circuit 132, the switch control circuit 132 turns off the charging path of the mobile terminal in order to protect the back-end circuit.

In this embodiment, a cathode of the diode D1 is connected to an anode of the battery B1 via the first resistor R1, and is also connected to the second input terminal 3 of the PMU 120; and the second input terminal 3 is mainly used to detect the charging current flowing through the diode D1. A cathode of the battery B1 is grounded, and the anode of the battery B1 is also connected to the third input terminal 4 of the PMU 120. The third input terminal 4 is mainly used to detect the voltage input of the battery B1. When the battery is fully charged, the output terminal 2 of the PMU 120 is controlled to turn off the charging circuit.

Figure 4:
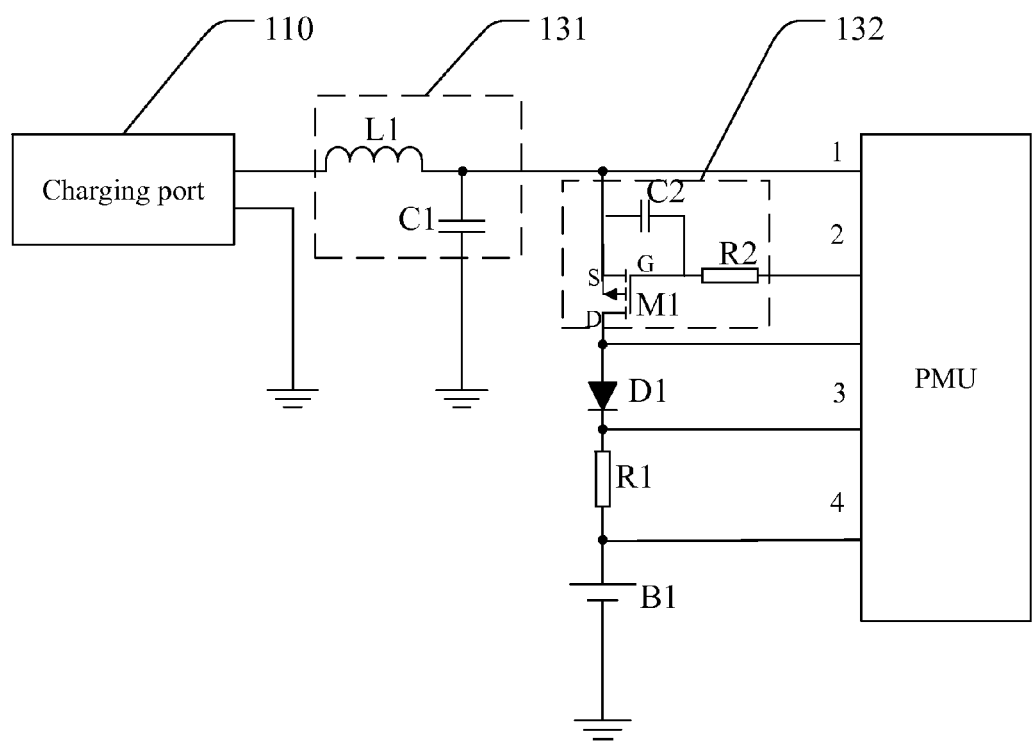
FIG. 4 is a schematic view illustrating the charging surge protection circuit of the mobile terminal according to the present disclosure.

Referring to FIG. 4 together, the low-pass filtering circuit 131 comprises an inductor L1 and a first capacitor C1. The inductor L1 is connected in series between the first output terminal of the charging port 110 and the first input terminal 1 of the PMU 120, and the first capacitor C1 has one end connected to the inductor L1 and the other end grounded.

In this embodiment, the value of the inductance L1 is 10 µH and the value of the first capacitance is 10 µF, so a cut-off frequency of the low-pass filtering circuit 131 is $fc=1/2\pi\sqrt{LC}=16$ kHz. The aforesaid surge of 20 ns has a pulse frequency of 50 kHz, so the low-pass filtering circuit can greatly attenuate such a surge and can significantly reduce the surge energy transmitted into the mobile terminal. Of course, in the low-pass filtering circuit of the present disclosure, the value range of the voltage and that of the first capacitance may further be adjusted according to the frequency of the surge voltage that possibly occurs in practical applications.

Referring still to FIG. 3 and FIG. 4, the switch control circuit 132 comprises an MOS transistor M1 and a second capacitor C2. The MOS transistor M1 has a source S connected to the first input terminal 1 of the PMU 120, a gate G connected to the output terminal 2 of the PMU 120, and a drain D connected to the anode of the diode D1. The MOS transistor is a P-channel MOS transistor, and mainly serves as a switch in the charging circuit of the mobile terminal.

The second capacitor C2 is disposed between the source S and the gate G of the MOS transistor M1. That is, the second capacitor C2 has one end connected to the source S of the MOS transistor and the other end connected to the gate G of the MOS transistor. The second capacitor mainly has a coupling function in the switch control circuit. In this embodiment, a second resistor R2 is further connected in series between the gate G of the MOS transistor M1 and the output terminal of the PMU 120.

During the battery charging process of the mobile terminal, the second capacitor C2 is mainly used to couple the surge voltage from the source S of the MOS transistor M1 to the gate G and, thus, force the MOS transistor M1 to be turned off in order to protect the back-end circuit. In this embodiment, the second resistor R2 is mainly used to provide a coupling potential of the gate G of the MOS transistor, and also serves to protect ports of the PMU 120.

During the battery charging process of the mobile terminal, the charging current flows from the charging port 110 through the inductor L1, the MOS transistor M1, the diode D1, the first resistor R1 and the battery B1 in sequence. In this way, the individual ports and the battery of the mobile terminal are effectively protected through protection of the aforesaid two stages of protection circuits during the battery charging process of the mobile terminal. Of course, in other embodiments, it may also be possible to choose one of the protection circuits as a protection circuit for use in the battery charging process of the mobile terminal.

According to the above descriptions, a charging surge protection circuit is disposed in the mobile terminal of the present disclosure for protection against the charging surge during the battery charging process of the mobile terminal. Moreover, the charging surge protection circuit comprises a low-pass filtering circuit and a switch control circuit, so two surge voltage protection stages are achieved in the mobile terminal to effectively protect individual ports and the battery of the mobile terminal.

As compared to the conventional charging circuit of the prior art mobile terminal, the present disclosure only additionally provides one resistor, one capacitor and one inductor to constitute a two-stage charging protection circuit. Therefore, the present disclosure is relatively easy to be implemented in circuit, and has a relatively low cost.

The present disclosure is described only exemplarily in the aforesaid embodiments. Those of ordinary skill in the art can make equivalent replacements or alterations according to the technical solutions of the present disclosure and the inventive concepts thereof, and all these alterations and replacements shall be covered within the scope of the appended claims.

What is claimed is:

1. A mobile terminal, comprising a charging port, a power management unit (PMU) and a battery, wherein the mobile terminal further comprises a charging surge protection circuit disposed between the charging port and the PMU;
   the charging surge protection circuit comprises a low-pass filtering circuit, a switch control circuit, a diode and a first resistor;
   the low-pass filtering circuit has an input terminal connected to an output terminal of the charging port, and an output terminal connected to a first input terminal of the PMU;
   the switch control circuit has a first input terminal connected to the low-pass filtering circuit, a second input terminal connected to an output terminal of the PMU, and an output terminal connected to the first resistor via the diode; and
   the first resistor is connected to an anode of the battery, and a cathode of the battery is grounded, wherein a cathode of the diode is connected to a second input terminal of the PMU and the anode of the battery is connected to a third input terminal of the PMU;
   wherein during a battery charging process of the mobile terminal, a charging current flows from the charging port and passes through the low-pass filtering circuit, the switch control circuit, the diode, the first resistor and the battery in sequence to charge the battery;
   wherein the switch control circuit comprises a metal oxide semiconductor (MOS) transistor and a second capacitor; the MOS transistor has a source connected to the first input terminal of the PMU, a gate connected to the output terminal of the PMU, and a drain connected to the diode; and the second capacitor has one end connected to the source of the MOS transistor and the other end connected to the gate of the MOS transistor.

2. The mobile terminal of claim 1, wherein a second resistor is disposed between the gate of the MOS transistor and the output terminal of the PMU.

3. The mobile terminal of claim 1, wherein the MOS transistor is a P-channel MOS transistor.

4. The mobile terminal of claim 1, wherein the mobile terminal is a mobile phone.

5. The mobile terminal of claim 1, wherein the low-pass filtering circuit comprises an inductor and a first capacitor, the inductor is disposed between the output terminal of the charging port and the first input terminal of the PMU, and the first capacitor has one end connected to the inductor and the other end grounded.

6. The mobile terminal of claim 5, wherein during the battery charging process of the mobile terminal, the charging current flowing from the charging port passes through the inductor of the low-pass filtering circuit, the MOS transistor of the switch control circuit, the diode, the first resistor and the battery in sequence, to charge the battery.

7. The mobile terminal of claim 1, wherein the second capacitor is disposed between the source of the MOS transistor and the gate of the MOS transistor to couple a surge voltage from the source of the MOS transistor to the gate of the MOS transistor when the surge voltage is provided at the source of the MOS transistor, such that the transistor is forced to be turned off.

\* \* \* \* \*